United States Patent
Cook et al.

[19]

[11] Patent Number: 6,011,327
[45] Date of Patent: Jan. 4, 2000

[54] AC TRANSFER SWITCH

[75] Inventors: Wayne Kenneth Cook, Louisville; Philip James Windholz, Longmont, both of Colo.

[73] Assignee: International Business Machines Corporation, Armonk, N.Y.

[21] Appl. No.: 08/994,118

[22] Filed: Dec. 19, 1997

[51] Int. Cl.[7] .................................................. H01H 47/00
[52] U.S. Cl. ........................ 307/125; 307/130; 307/139; 361/79
[58] Field of Search .................. 307/43, 64, 125, 307/66, 85, 86, 87, 103, 139; 361/52, 78, 79; 340/333, 66, 85, 86, 87, 130, 139

[56] References Cited

U.S. PATENT DOCUMENTS

| | | | |
|---|---|---|---|
| 3,293,446 | 12/1966 | Baude | 307/64 |
| 3,515,896 | 6/1970 | Swing et al. | 307/64 |
| 3,646,355 | 2/1972 | Ireland et al. | 307/64 |
| 3,778,633 | 12/1973 | DeVisser et al. | 200/50 |
| 4,189,649 | 2/1980 | Przywozny et al. | 307/64 |
| 4,208,593 | 6/1980 | Sullivan | 307/35 |
| 4,240,053 | 12/1980 | Nelson et al. | 335/16 |
| 4,262,214 | 4/1981 | Patel | 307/51 |
| 4,351,013 | 9/1982 | Matsko et al. | 361/96 |
| 4,384,213 | 5/1983 | Bogel | 307/64 |
| 4,405,867 | 9/1983 | Moakler et al. | 307/64 |
| 4,446,376 | 5/1984 | Baker | 307/87 |
| 4,565,908 | 1/1986 | Bould | 361/337 |
| 4,811,163 | 3/1989 | Fletcher | 307/64 |
| 5,081,367 | 1/1992 | Smith et al. | 307/64 |
| 5,138,184 | 8/1992 | Keefe . | |
| 5,334,877 | 8/1994 | Mohan et al. . | |
| 5,347,164 | 9/1994 | Yeh . | |
| 5,436,415 | 7/1995 | Smith et al. | 200/50 C |
| 5,461,263 | 10/1995 | Helfrich . | |
| 5,579,197 | 11/1996 | Mengelt et al. | 307/66 |
| 5,581,133 | 12/1996 | Smith et al. | 307/64 |
| 5,619,077 | 4/1997 | Green et al. . | |
| 5,644,175 | 7/1997 | Galm | 307/131 |
| 5,679,985 | 10/1997 | Brailey et al. | 307/18 |
| 5,739,594 | 4/1998 | Sheppard et al. | 307/64 |
| 5,770,897 | 6/1998 | Bapat et al. | 307/127 |
| 5,784,268 | 7/1998 | Steffek et al. | 307/66 |
| 5,790,394 | 9/1998 | Cabaniss et al. | 307/82 |
| 5,801,937 | 9/1998 | Gold et al. | 307/66 |
| 5,814,904 | 9/1998 | Galm | 307/130 |

FOREIGN PATENT DOCUMENTS 4-26337  1/1992  Japan .

*Primary Examiner*—Jeffrey Gaffin
*Assistant Examiner*—Peter Zura
*Attorney, Agent, or Firm*—Altera Law Group, LLC

[57] ABSTRACT

An AC transfer switch is provided for switching between a first line cord and a second line cord. The AC transfer switch is designed to be fault tolerant and ensures that continuous operating power is supplied to a load during the transfer process. The system includes a first input from a first power line cord, a second input from a second power line cord, a switch for switching an output between the first and second power line cord, wherein the switch further includes a first contactor set for selecting the first line cord and a second contactor set for selecting the second line cord, the first and second contactor sets including two contactors in series and a control circuit for controlling the switch to select between the first and second power line cords. The system further includes a first auxiliary contactor circuit associated with the first contactor set and a second auxiliary contactor circuit associated with the second contactor set, the first auxiliary contactor circuit preventing the second contactor set from selecting the second power line cord when the first contactor set is selecting the first line cord.

14 Claims, 4 Drawing Sheets

AC TRANSFER SWITCH

BACKGROUND OF THE INVENTION

1. Field of the Invention

This invention relates in general to an uninterruptible power supplies, and more particularly to an AC transfer switch for switching between a first line cord and a second line cord.

2. Description of Related Art

Modem-day communication and computer equipment utilize solid state integrated circuits technology to transmit and control data and switching information. Circuits utilizing solid state integrated circuit technology are highly susceptible to variations in electric power from some desired standard. The power to energize these circuits can be readily derived from commercial AC power. The signal consistency of commercial AC power, however, is unreliable due to user demand and other extraneous considerations causing power level fluctuations. These signal variations can take the form of blackouts, brownouts, or transient interruptions or surges. Power outages that extend for a long period of time, on the order of seconds and longer, can render computer peripheral equipment as unavailable.

Typical subsystems are designed to ride through power outages that last up to 20 milliseconds. If the subsystem is designed for battery backup, the system can continue to operate for several minutes before the unit shuts off due to the batteries discharging. Unfortunately, some power outages can last for an extended period of time beyond the holdup capabilities of the batteries. Therefore, customers have required subsystems that are designed to accommodate two separate incoming power line cords. With two separate incoming power line cords, in the event of a power loss on one power cord, the second power cord will deliver the necessary power to keep the subsystem operational. The main reason for this requirement is that customers want the most reliable equipment that they can get due to the high costs, to the customer, associated with the subsystem being down.

Previous designs have also provided increased fault tolerance. To overcome the problems with the single power line cord, subsystems have been designed with a 2N power system. In other words, each power line cord would have its own separate power system, i.e., twice the reliability. Therefore, in the event of a power outage on one line cord, the second line cord's power system is capable of powering the entire subsystem.

Unfortunately, a 2N power system adds additional cost to the product. For example, a fully configured subsystem may require ten AC/DC power supplies to meet the specified power requirements. However, each of the AC/DC power supplies may cost $1,000. To accommodate a 2N power system, an additional 10 AC/DC power supplies would be needed thereby increasing the overall cost by $10,000, excluding packaging, cabling and other miscellaneous costs.

If an AC switch was used to transfer the power from one line cord, during an extended power outage, to a second line cord, only two extra AC/DC power supplies would be needed to accommodate an N+1 power system. A N+1 power system includes a redundant power supply for additional system reliability. Since the AC switch typically cost approximately $300, the overall savings would easily approach $10,000 per fully configured subsystem.

Nevertheless, the major problem with designing an AC switch, for application in computer peripheral equipment, is twofold. First, the AC switch has to be fault tolerant to meet the product safety requirements. When power is being supplied to a subsystem by one line cord, the second line cord can not be connected to the first line cord's power source. Second, the AC switch needs to operate in such a manner that the subsystem will continue to operate non-destructively. In other words, the subsystem must continue to operate normally, without shutting down, when the switch changes from one line cord to the second line cord.

It can be seen then that there is a need for an AC transfer switch that is designed to be fault tolerant.

It can also be seen that there is a need for an AC transfer switch that will ensure that continuous operating power is supplied to a load during the transfer process.

SUMMARY OF THE INVENTION

To overcome the limitations in the prior art described above, and to overcome other limitations that will become apparent upon reading and understanding the present specification, the present invention discloses an AC transfer switch for switching between a first line cord and a second line cord.

The present invention solves the above-described problems by providing an AC transfer switch that is designed to be fault tolerant and which will ensure that continuous operating power is supplied to a load during the transfer process.

A system in accordance with the principles of the present invention includes a first input from a first power line cord, a second input from a second power line cord, a switch for switching an output between the first and second power line cord, wherein the switch further includes a first contactor set for selecting the first line cord and a second contactor set for selecting the second line cord, the first and second contactor sets including two contactors in series and a control circuit for controlling the switch to select between the first and second power line cord.

Other embodiments of a system in accordance with the principles of the invention may include alternative or optional additional aspects. One such aspect of the present invention is that the control circuit activates only the first contactor set or the second contactor set.

Another aspect of the present invention is that the system further includes a first auxiliary contactor circuit associated with the first contactor set and a second auxiliary contactor circuit associated with the second contactor set, the first auxiliary contactor circuit preventing the second contactor set from selecting the second power line cord when the first contactor set is selecting the first line cord.

Another aspect of the present invention is that the second auxiliary contactor circuit preventing the first contactor set from selecting the first power line cord when the second contactor set is selecting the second line cord.

Another aspect of the present invention is that the first contactor set includes a front and rear contactor in series.

Another aspect of the present invention is that the control circuit further includes a first coil for closing the front contactor of the first contactor set and a second coil for closing the rear contactor of the first contactor set.

Another aspect of the present invention is that the second contactor set includes a front and rear contactor in series.

Yet another aspect of the present invention is that the control circuit further includes a third coil for closing the front contactor of the second contactor set and a fourth coil for closing the rear contactor of the second contactor set.

Another aspect of the present invention is that the control circuit further includes a first signal generator for providing signals for activating the first and second coils and a second signal generator for providing signals for activating the third and fourth coils.

Another aspect of the present invention is that the first signal generator includes a first time delay circuit for delaying the activation of the first and second coils.

Another aspect of the present invention is that the second signal generator includes a second time delay circuit for delaying the activation of the third and fourth coils.

Another aspect of the present invention is that the system further includes a first auxiliary contactor circuit associated with the second signal generator and a second auxiliary contactor circuit associated with the first signal generator, the first auxiliary contactor circuit preventing the second signal generator from providing signals for activating the third and fourth coils, and the second auxiliary contactor circuit preventing the first signal generator from providing signals for activating the first and second coils.

Another aspect of the present invention is that the system further includes a toggle circuit for selectively activating the first and second signal generators.

Another aspect of the present invention is that the system further includes a fault detection circuit for detecting a power failure, the fault detection circuit controlling the toggle circuit to switch between the first and second power line cords.

Still another aspect of the present invention is that the fault detection circuit includes a timer circuit and a disable signal generator, the disable signal generator monitoring the output to detect a power failure and providing the timer circuit a signal indicating a power failure, the timer circuit controlling the toggle circuit to switch between the first and second power line cord.

Another aspect of the present invention is that the system further includes a power up circuit for ensuring that the toggle circuit does not switch between the first and second power line cord during power up.

Another aspect of the present invention is that the system further includes a battery backup system for supplying power to the output when the switch is switching between the first and second power line cord.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an AC transfer switch for switching between a first line cord and a second line cord. The AC transfer switch is designed to be fault tolerant and ensures that continuous operating power is supplied to a load during the transfer process.

Figure 1:
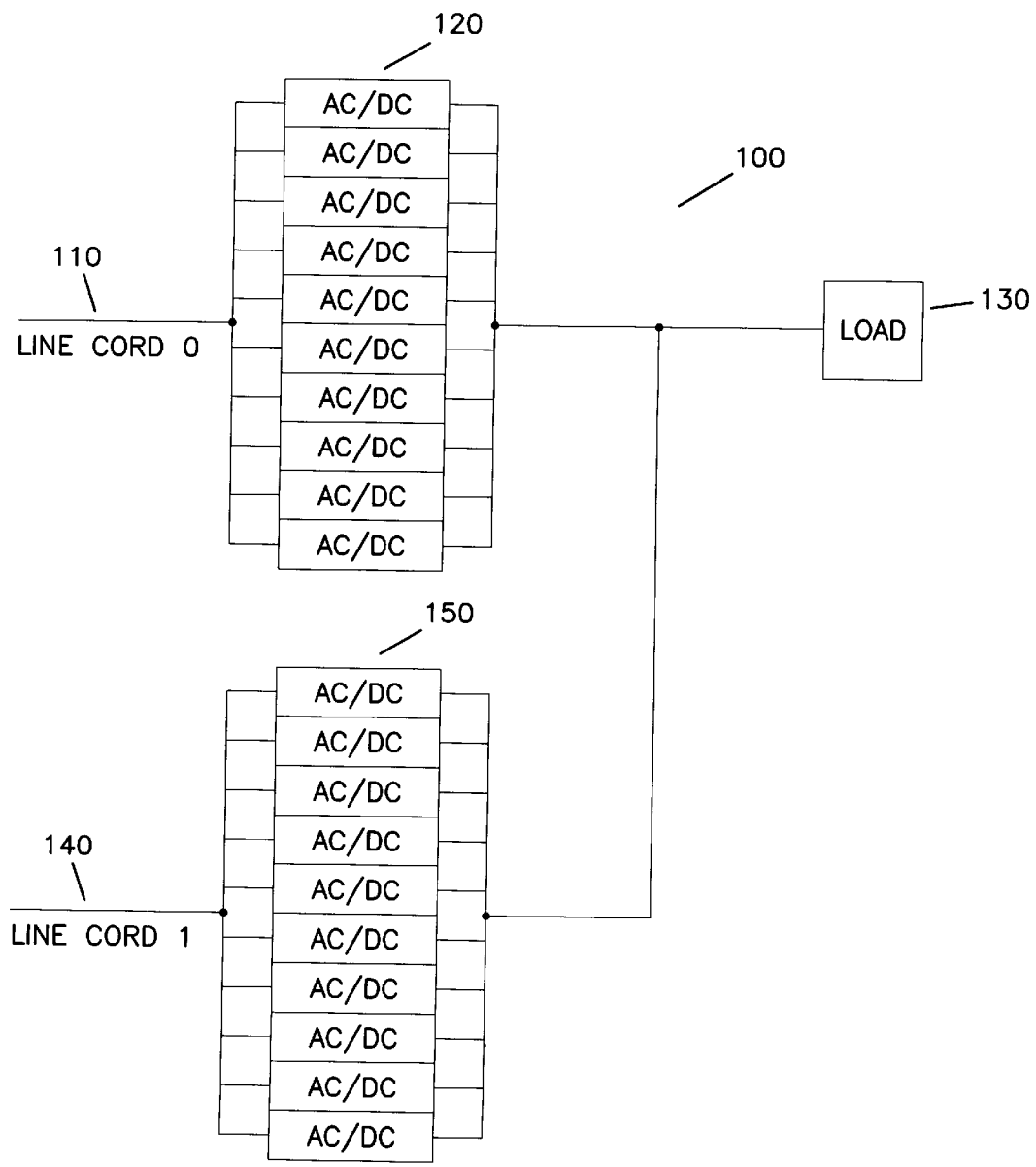
FIG. 1 illustrates a two-N power system according to the prior art.

FIG. 1 illustrates a two-N power system 100 according to the prior art. A first power line cord 110 supplies power to a bank of 10 AC/DC power supplies 120 which provide power to load 130. A second power line cord 140 supplies AC power to a second bank of 10 AC/DC power supplies 150 that are also connected to the load 130. Since each bank of power supplies 120, 150 are powering the load, each typically runs at less than 50% of its maximum power rating. Typically, each of the power supply banks 120, 150 would be running at about 40%. If a failure occurs to power line cord 110, then all power to load 130 would be supplied by the second bank of AC/DC power supplies 150. The second bank of AC/DC power supplies 150 would thereby operate at 80% of its maximum power rating. However, as mentioned above, a two-N power system shown in FIG. 1 adds additional cost to the product.

Figure 2:
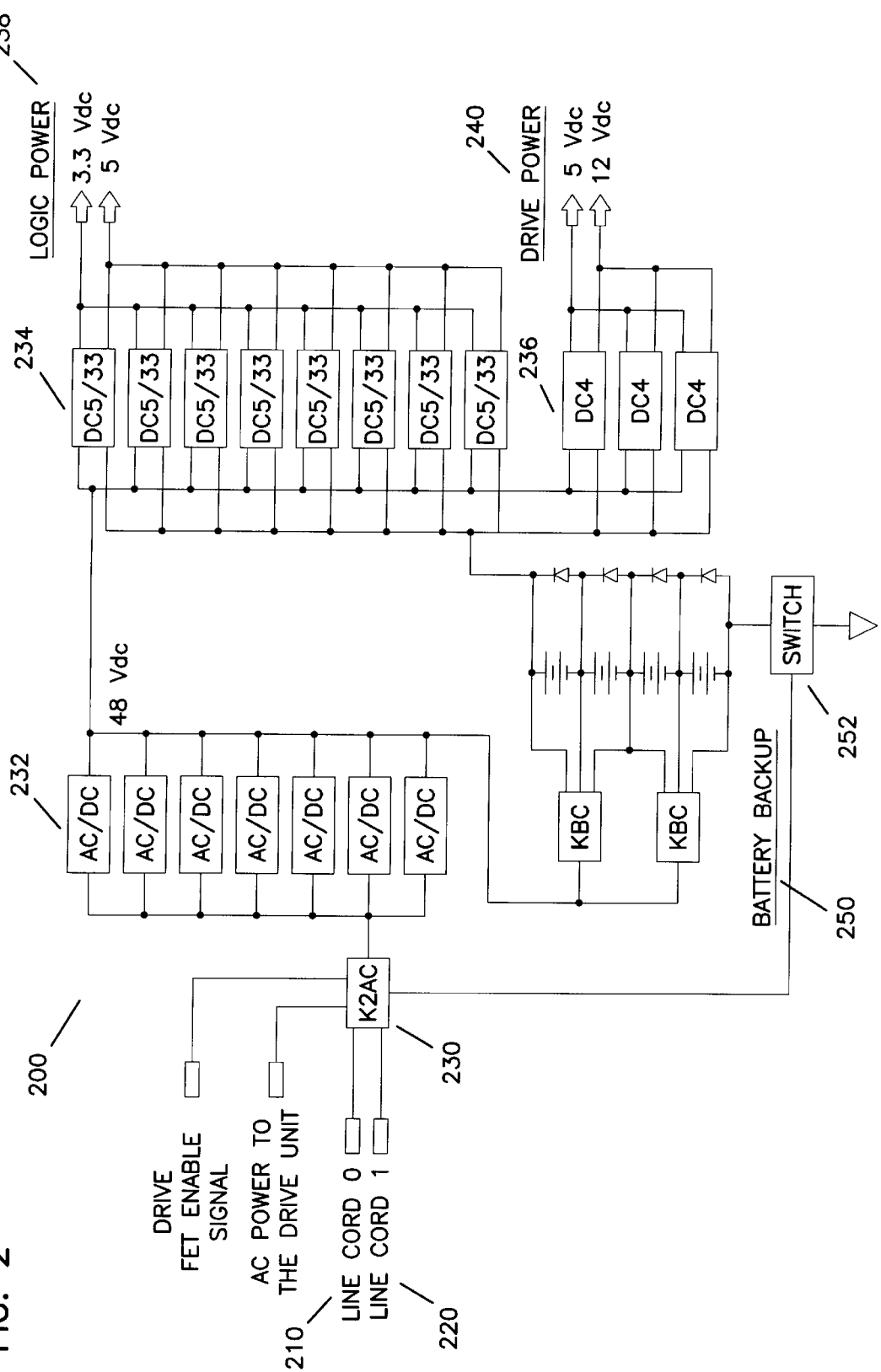
FIG. 2 illustrates a block diagram of a controller system using an AC transfer switch according to the present invention.

FIG. 2 illustrates a block diagram 200 of a controller system using an AC transfer switch according to the present invention. Two line cords 210, 220 are routed to the AC transfer switch 230. One of the line cords 210 or 220 is selected by the AC transfer switch 230 to provide power to the power supplies 232 for the controller system. The power supplies provide 48 volts DC to converter banks 234 and 236 (represented by load 130 in FIG. 1). Converter bank 234 provides logic power 238 of 3.3 volts DC and 5 volts DC. The second converter bank 236 provides drive power 240 of 5 volts DC and 12 volts DC. According to the invention, when a first selected line cord 210 or 220 experiences a failure, battery back-up 250 is switched in to provide the 48 volts to the first 234 and second 236 banks of converters. Switch 252 senses the failure and switches the battery back-up 250 into the circuit. Meanwhile, AC transfer switch 230 switches from the first selected line cord 210 to the second line cord 220. The battery back-up 250 is then switched out of the circuit as power is reconnected to the bank of power supplies 232. The battery back-up provides nondestructive subsystem operation in the event that one of the operating line cords 210, 220 fails.

Figure 3:
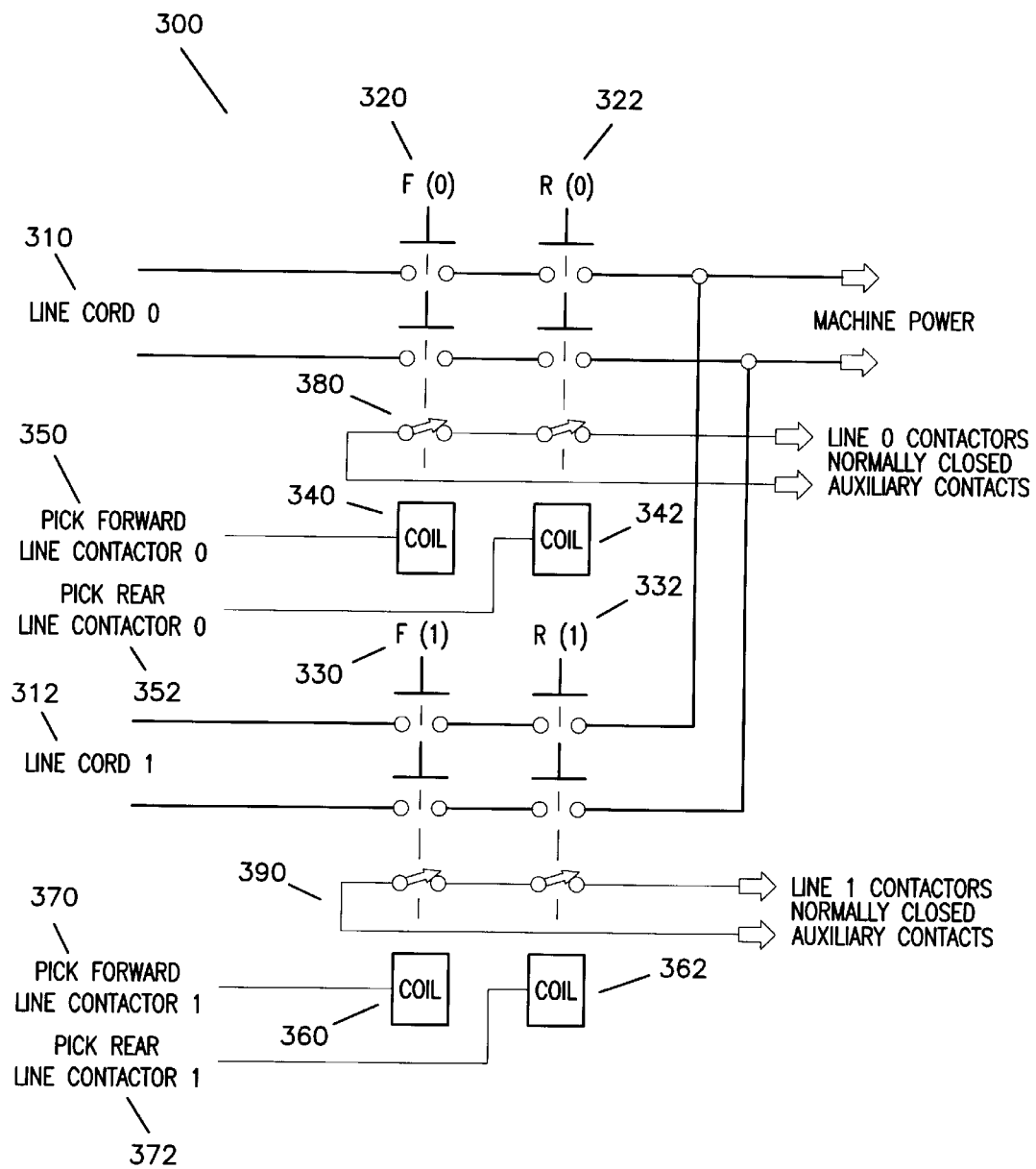
FIG. 3 illustrates the AC transfer switch.

FIG. 3 illustrates an AC transfer switch 300 as illustrated as 230 in FIG. 2. The AC transfer switch provides an input for line cord zero 310 and for line cord one 312. Power from line cord zero must pass through contactors F0 320 and R0 322 to provide power to the power supplies (not shown). Likewise, the power signal from line cord one 312 must pass through contactors F1 330 and R1 332. Coils 340 and 342 control the operation of contactors 320 and 322, respectively. The signal for coil 340 is provided by the pick forward line contactor zero signal 350. The control signal for coil 342 is provided by pick forward line contactor zero signal 352.

Contactors 330 and 332 are controlled by coils 360 and 362, respectively. Coil 360 is controlled by pick forward line contactor one signal 370. Coil 362 is controlled by pick rear line contactor one signal 372. Line zero contactors auxiliary contacts 380 ensure that pick forward line contactor one signal 370 and pick rear line contactor one signal 372 cannot activate coils 360, 362 to close contactors 330, 332. Similarly, line one contactors auxiliary contacts 390 ensure that pick forward line contactor zero signal 350 and pick rear line contactor zero signal 352 do not activate coils 340, 342 to close contactors 320 and 332. Therefore, an interlock is provided for electronically blocking the simultaneous activation of contactors 320, 322 for line cord zero and contactors 330, 332 for line cord one.

In operation, power is supplied from line cord zero through contactors 320, 322 to a load by pick forward line contactor zero signal 350 and pick rear line contactor zero signal 352. If power is lost to line cord zero, or the voltage drops enough, line cord zero 310 may be switched out and line cord one 312 may be switched in.

Figure 4:
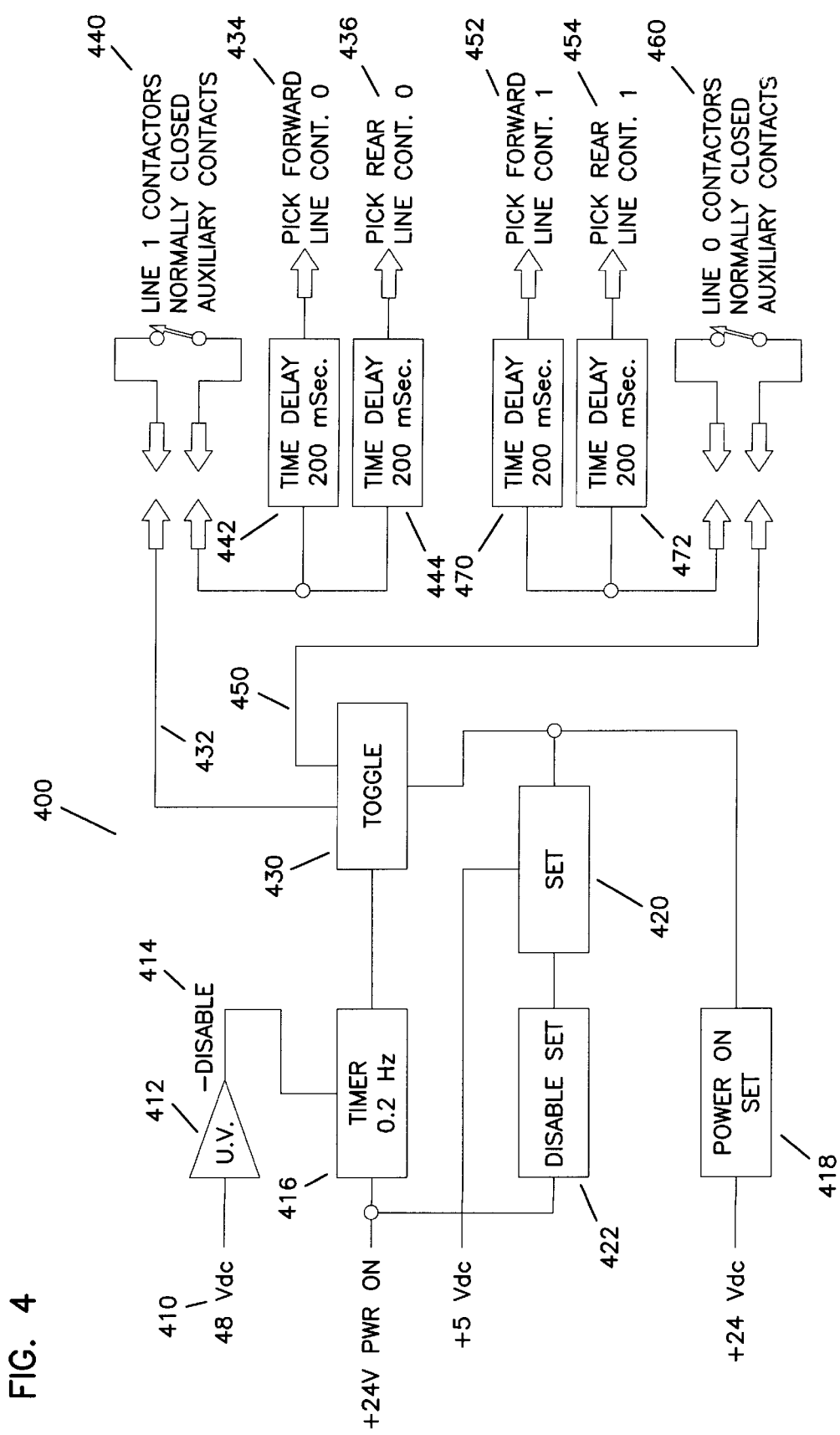
FIG. 4 illustrates a block diagram of the AC transfer switch control.

FIG. 4 illustrates a block diagram of an AC transfer switch controller 400, which provides control signals 350, 352, 370, 372 illustrated in FIG. 3. If the 48 volt bus 410 is within specifications, amplifier 412 sends a disable signal 414 to timer 416. During power on, the power on set provides control to set 420 and disable set 422 for controlling the toggling of the contactors. When the 48 volt bus begins to function outside its operating specification due to a power failure or when the voltage level drops below a threshold, amplifier 412 provides the activation of timer 416 to toggle the contactors. Toggle 430 provides a signal 432 for activating pick forward line contactor zero signal 434 and pick rear line contactor zero signal 436. As mentioned with reference to FIG. 3, line one contactors auxiliary contacts 440 must be in the closed position before the pick forward line contactor zero signal 434 and pick rear line contact zero signal 436 are issued. Time delays 442, 444 provide a 200 millisecond delay to the issuance of the pick forward line contactor zero signal 434 and pick rear line contactor zero signal 436.

When the timer is activated, the toggle 430 switches activation signal to line 450 for activation of the pick forward line contactor one signal 452 and pick rear line contactor one signal 454. Line zero contactors auxiliary contacts 460 ensure that the line one contactors are not closed while the line zero contactors are closed. Time delays 470, 472 add a 200 millisecond delay to the issuance of the pick forward line contactor one signal 452 and pick rear line contactor one signal 454.

Accordingly, the AC transfer switch has been designed to be fault-tolerant. The dual, series contactor arrangement 320/322, 330/332 provide the AC transfer switch with additional fault tolerance by ensuring that no single failure will cause the safety requirements of separation of line cord zero and line cord one to be compromised. Thus, failure of one contactor does not jeopardize the safety requirements for proper spacing since the second contactor also meets the specified safety requirements for proper spacing.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An AC transfer switch, comprising:

a first AC input from a first AC power line cord;

a second AC input from a second AC power line cord;

a switch for switching an output between the first and second AC power line cord, wherein the switch further comprises a first contactor set for selecting the first AC line cord in response to a first contact signal and a second contactor set for selecting the second AC line cord in response to a second contact signal, each of the first and second contactor sets including two contactors in series;

a control circuit for generating a control signal to control the selection between the first and second AC power line cords by toggling between a first and second output port; and a first contactor set auxiliary contact in series with the first contactor set for receiving the control signal when the control signal is at the first output port and a second contactor set auxiliary contact in series with the second contactor set for receiving the control signal when the control signal is at the second output port, the first contactor set auxiliary contact being logically disposed to ensuring that the second contactor set does not receive the second contact signal when the first contactor set is closed and the second contactor set auxiliary contact being logically disposed to ensuring that the first contactor set does not receive the first contact signal when the second contactor set is closed.

2. The AC transfer switch of claim 1 wherein the control circuit activates only the first contactor set or the second contactor set.

3. The AC transfer switch of claim 1 wherein the two contactors in series of the first and second contactor sets are spaced apart by a predetermined distance.

4. The AC transfer switch of claim 1 wherein the first contactor set comprises a front and rear contactor in series.

5. The AC transfer switch of claim 4 wherein the first contactor set further comprises a first coil for closing the front contactor of the first contactor set and a second coil for closing the rear contactor of the first contactor set in response to the first contactor set receiving the control signal.

6. The AC transfer switch of claim 5 wherein the second contactor set comprises a front and rear contactor in series.

7. The AC transfer switch of claim 6 wherein the second contactor set further comprises a third coil for closing the front contactor of the second contactor set and a fourth coil for closing the rear contactor of the second contactor set in response to the first contactor set receiving the control signal.

8. The AC transfer switch of claim 1 wherein the control circuit comprises a first time delay circuit for delaying the generation of the control signal at the first output port.

9. The AC transfer switch of claim 8 wherein the control circuit comprises a second time delay circuit for delaying generation of the control signal at the first output port.

10. The AC transfer switch of claim 1 further comprising a fault detection circuit for detecting a power failure, the fault detection circuit controlling the toggling of the control signal between the first and second output ports.

11. The AC transfer switch of claim 10 wherein the fault detection circuit comprises a timer circuit and a disable signal generator, the disable signal generator monitoring the output to detect a power failure and providing the timer circuit a signal indicating a power failure, the timer circuit controlling the toggling of the control signal between the first and second output ports.

12. The AC transfer switch of claim 11 further comprising a power up circuit for ensuring that the control circuit does not switch between the first and second output ports during power up.

13. The AC transfer switch of claim 12 further comprising a battery backup system for supplying power to the output when the switch is switching between the first and second AC power line cords.

14. The AC transfer switch of claim 1 further comprising a battery backup system for supplying power to the output when the switch switches between the first and second AC power line cords.

* * * * *

UNITED STATES PATENT AND TRADEMARK OFFICE
CERTIFICATE OF CORRECTION

PATENT NO.    : 6,011,327
DATED         : January 4, 2000
INVENTOR(S)   : Cook et al.

It is certified that error appears in the above-identified patent and that said Letters Patent is hereby corrected as shown below:

Column 6,
Line 41, after "delaying" insert -- the activation of --

Signed and Sealed this

Twenty-seventh Day of August, 2002

Attest:

Attesting Officer

JAMES E. ROGAN
*Director of the United States Patent and Trademark Office*